J. H. SPRAGUE.
WIND SHIELD.
APPLICATION FILED JULY 2, 1908.
925,240.
Patented June 15, 1909.
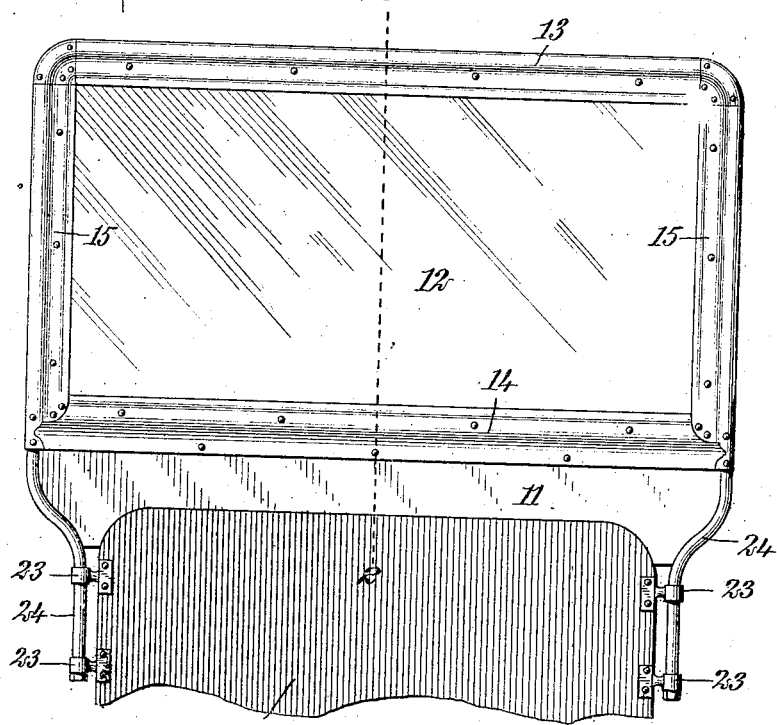
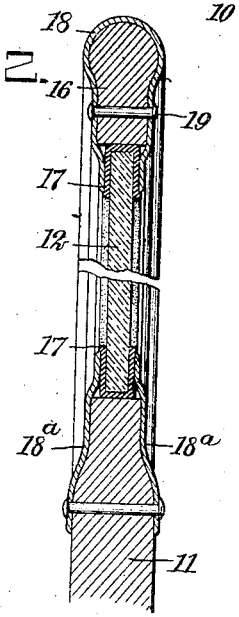
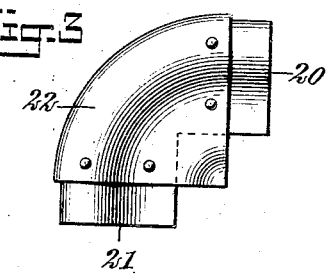
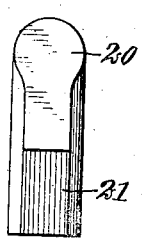
WITNESSES
INVENTOR
James H. Sprague
BY
ATTORNEYS

UNITED STATES PATENT OFFICE.

JAMES H. SPRAGUE, OF NORWALK, OHIO.

WIND-SHIELD.

No. 925,240.

Specification of Letters Patent.

Patented June 15, 1909.

Application filed July 2, 1908. Serial No. 441,573.

*To all whom it may concern:*

Be it known that I, JAMES H. SPRAGUE, a citizen of the United States, and a resident of Norwalk, in the county of Huron and State of Ohio, have invented a new and Improved Wind-Shield, of which the following is a full, clear, and exact description.

This invention relates to certain improvements in wind shields and more particularly to improvements in the frame which supports the transparent section.

One object of my invention is to provide improved means for connecting the lower portion of the frame with the dashboard or filler-board interposed between the wind shield and dashboard.

A further object of my invention is to provide an improved form of frame, whereby the same is rendered more rigid and more secure at the corners.

Reference is to be had to the accompanying drawings, forming a part of this specification, in which similar characters of reference indicate corresponding parts in all the figures, and in which—

Figure 1 is a front view of a wind shield constructed in accordance with my invention; Fig. 2 is a vertical section on the line 2—2 of Fig. 1 and upon a somewhat enlarged scale; Fig. 3 is a side elevation of a reinforcing corner piece used in the formation of the frame; and Fig. 4 is an end view of the wooden dowel forming a portion of the corner piece shown in Fig. 3.

My improved wind shield is adapted to be secured to any suitable form of dashboard 10, and is preferably provided with a filler piece 11 which engages with the lower portion of the frame of the wind shield and may be cut at its lower edge to fit the upper edge of the dashboard. The wind shield proper includes a transparent section 12, preferably of plate glass, and a frame formed of an upper section 13 extending along the upper edge thereof, a lower section 14 connecting the wind shield with the filler board, and two end sections 15 extending vertically along the ends and connecting the upper and lower sections 13 and 14. The end sections and top section are substantially alike in construction, the details of the top section being clearly shown in Fig. 2. The frame is provided with a wooden filler or body portion 16 which is of, what might be called "keyhole shape" in cross section, that is, it includes an outer substantially cylindrical portion and a flange or extension having substantially parallel sides. The edge of the glass comes adjacent the narrower portion of the filler and is spaced therefrom by a strip 17 of rubber substantially U-shaped in cross section. The frame is held to the glass by a strip of sheet metal forming a molding 18, bent to include the wooden filler and having flanges which engage with the outer surfaces of the rubber strip 17 and terminate adjacent the free edges of the latter. The flanges of the sheet metal inclosing or covering resiliently bear upon the rubber strip so that they hold the latter firmly therebetween. The sheet metal casing or covering is held to the filler by suitable rivets, bolts, or screws 19.

At the lower edge of the glass the latter is connected to the filler board 11 by the frame section 14. In this section of the frame the wooden filler or body is eliminated and the upper edge of the filler board is employed in place thereof. The rubber strip 17 which incloses the lower edge of the glass, rests directly upon the upper edge of the filler board, and in place of providing a single sheet metal strip to extend upon both sides of the glass, there are provided two separate strips $18^a$, $18^a$, each of which has one free edge adjacent the free edge of the rubber strip and has the opposite free edge riveted to the filler board at a distance from the end thereof. The upper edge of the filler board is formed of less thickness than the main portion thereof, to correspond with the thinner portion of the filler 16 and to render the lower frame section 14 as nearly similar in appearance to the upper section 13 as convenient. The width of the strips $18^a$ is substantially equal to the total width of the upper frame section 13.

The end frame sections 15 are connected to the upper frame section 13 by means of wooden or metal dowels and pressed brass corner pieces. Each dowel has two portions 20 and 21 intersecting at right angles and each having substantially the same cross sectional form as the filler of the frame sections 13 and 15. The outer edge of the dowel is curved in the arc of a circle so that the dowel forms a continuation of the filler pieces of both the top and the side and presents a rounded corner. The dowel is covered by a pressed brass casing or covering 22 suitably riveted thereto, but this covering or casing does not extend to the ends of the dowels. The ends of the dowels extend within the covering or casing 13 of the sides and top and is riveted therein to hold the sides, ends and corner sections of the frame together.

For rigidly securing the wind shield to the dashboard, the latter is preferably provided with brackets 23 adjacent each end thereof, which receives rods 24 extending along the ends of the filler board and up into the end sections 15, 15 of the frame. The construction is substantially as shown in my previous application, Serial Number 426,041, filed April 9, 1908.

In the construction above described, all of the parts are rigidly and firmly secured together and present an ornamental appearance. Any water flowing down the glass into engagement with the lower frame section 14 will be deflected off by the sheet metal strips 18ª, 18ª' into engagement with the sides of the filler board. No water can come in contact with the edge of the filler board or get between the frame and the latter.

Having thus described my invention, I claim as new and desire to secure by Letters Patent:

1. The combination with a vehicle having a dashboard, of a wind shield supported above the same and substantially in the plane thereof, said wind shield including a piece of glass, a filler board intermediate the edge of the glass and the edge of the dashboard and engaging with the latter, a packing inclosing the lower edge of the glass and resting upon the upper edge of the filler board to support the glass, and sheet metal strips having their lower edges secured to said filler board adjacent the upper edge of the latter and having their upper edges in resilient engagement with the sides of the packing for preventing lateral movement of the glass.

2. The combination with a vehicle having a dashboard, of a wind shield supported above the same and substantially in the plane thereof, said wind shield including a piece of glass, a filler board intermediate the edge of the glass and the edge of the dashboard and engaging with the latter, a packing inclosing the lower edge of the glass and resting upon the upper edge of the filler board to support the glass, and sheet metal strips having their lower edges secured to said filler board adjacent the upper edge of the latter and having their upper edges in resilient engagement with the sides of the packing for preventing lateral movement of the glass, the upper edge of this filler board adjacent said glass being of reduced thickness and said strips lying in substantially inclined planes at an angle to each other.

In testimony whereof I have signed my name to this specification in the presence of two subscribing witnesses.

JAMES H. SPRAGUE.

Witnesses:
 A. B. GRIFFIN,
 F. A. YOUNG.